United States Patent [19]

Stottlemyer et al.

[11] Patent Number: 4,885,773
[45] Date of Patent: Dec. 5, 1989

[54] APPARATUS FOR MOUNTING A UNIDIRECTIONAL MICROPHONE IN A HANDS-FREE TELEPHONE SUBSET

[75] Inventors: William O. Stottlemyer, Corinth, Miss.; Steven J. Woodward, Raleigh, N.C.

[73] Assignee: Alcatel N.V., Amsterdam, Netherlands

[21] Appl. No.: 1,781

[22] Filed: Jan. 9, 1987

[51] Int. Cl.[4] .................... H04M 9/08; H04M 1/04
[52] U.S. Cl. .................... 379/420; 381/169; 381/155
[58] Field of Search ............... 379/388, 389, 390, 420, 379/432; 381/58, 88, 87, 92, 94, 122, 155, 159, 169, 188, 191, 205

[56] References Cited

U.S. PATENT DOCUMENTS

| 2,718,563 | 9/1955 | Nicholides | 381/162 |
|---|---|---|---|
| 3,426,160 | 2/1969 | Ring | 379/432 |
| 3,534,183 | 10/1970 | Knowles | 381/162 X |
| 3,870,820 | 3/1975 | Suzuki et al. | 381/155 |
| 4,178,488 | 12/1979 | Nishihata | 379/432 X |
| 4,232,205 | 11/1980 | Ribeyre | 381/162 |
| 4,237,339 | 12/1980 | Bunting et al. | 379/420 |
| 4,355,213 | 10/1982 | Marsh | 381/169 |
| 4,375,584 | 3/1983 | Muzumdor et al. | 379/429 X |
| 4,434,329 | 2/1984 | Nasu | 381/169 |
| 4,449,236 | 5/1984 | Walker, Jr. | 381/155 |
| 4,463,222 | 7/1984 | Paradowski | 381/155 |
| 4,685,137 | 8/1987 | Watson et al. | 381/174 |

FOREIGN PATENT DOCUMENTS

| 0092119 | 12/1978 | Japan | 381/155 |
|---|---|---|---|
| 0092120 | 12/1978 | Japan | 381/155 |
| 0141838 | 11/1980 | Japan | 381/169 |
| 0161557 | 9/1983 | Japan | 379/388 |
| 2150398 | 6/1985 | United Kingdom | 381/155 |

OTHER PUBLICATIONS

"Model S-1P Loudspeaker Telephone Set Acoustic Design", Kojima et al., Kenkya Sitsuyoka Hokoku, NTT, Japan, vol. 28, No. 3, pp. 477-486, 1979.

"Model S-1P Loudspeaker Telephone Set Design and Construction", Fujita et al., Review of Electrical Communication Laboratories, vol. 27, Nos. 5-6, May-Jun. 1979, pp. 368-374.

"Loudspeaker Equipment for Key Telephone", I. Yamagami et al., Japan Telecommunications Review, vol. 24, No. 1, Jan. 1982, pp. 29-33.

Primary Examiner—Jin F. Ng
Assistant Examiner—Randall S. Vaas
Attorney, Agent, or Firm—Spencer & Frank

[57] ABSTRACT

There is disclosed a shroud and housing assembly which is attached to or forms an integral part of the front sidewall of a hands-free telephone subset. The shroud assembly contains a trough which is directed along the length thereof and which terminates at one end in a housing for a microphone or similar device. The shroud has a flanged wall integrally secured to the microphone housing for accommodating an electret condenser microphone. The shroud section is further supported by means of upstanding posts which are connected to the sides of the or flange by means of thin webs. The posts and webs act to strengthen the housing while further providing support to prevent undesired vibrations which emanate from a loudspeaker contained within the subset housing from coupling to the accommodated microphone. The reinforced housing minimizes the coupling of mechanical borne vibrations between the subsets loudspeaker and the microphone. Partial slots are also placed around the outer edge of the shroud about the area which contains the microphone housing. These slots have little or no effect on acoustic signals arriving from the front of the subset but signals arriving from the rear enter both the slots and the front cavity opening. In this manner, the microphone discriminates against certain sounds which are cancelled out while preserving the unidirectional characteristics of the microphone.

13 Claims, 4 Drawing Sheets

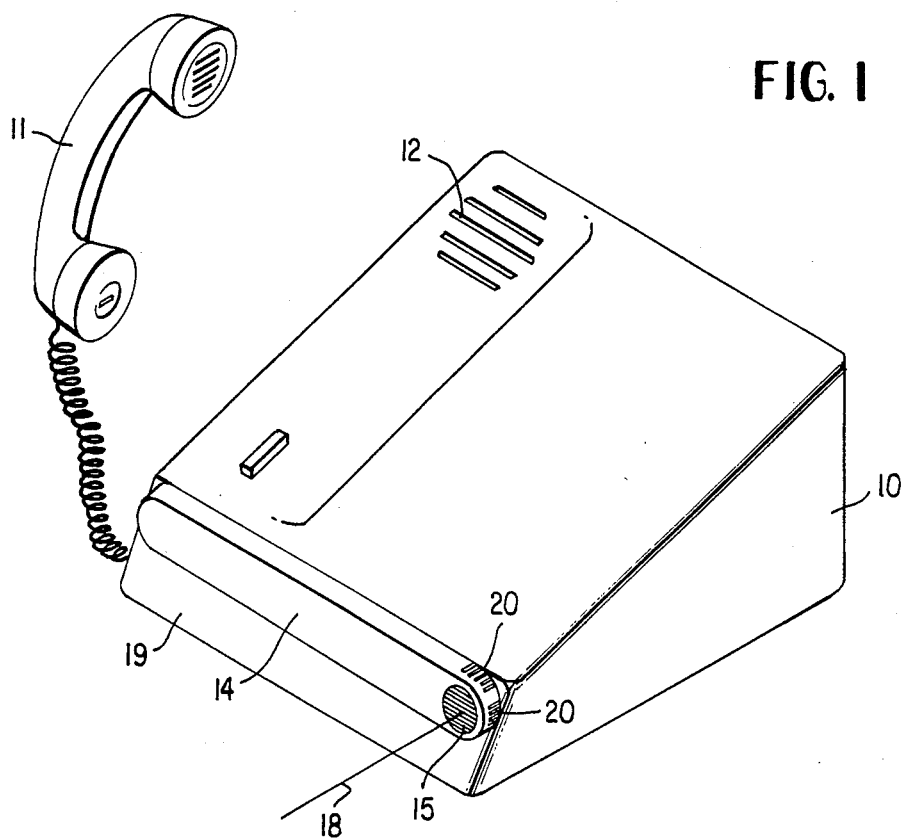
FIG. 1
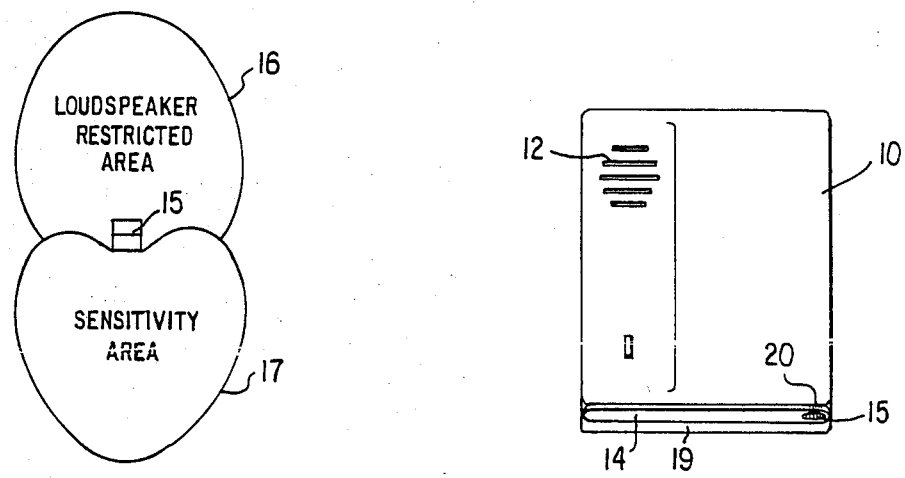
FIG. 2
FIG. 3

APPARATUS FOR MOUNTING A UNIDIRECTIONAL MICROPHONE IN A HANDS-FREE TELEPHONE SUBSET

BACKGROUND

This invention relates to a housing for mounting a microphone and more particularly to apparatus for mounting a unidirectional microphone in a hands-free telephone subset.

Present hands-free telephone subsets generally utilize an omnidirectional electret condenser microphone which is mounted directly inside the subset. As one can ascertain, there are many examples of hands-free telephone subsets which essentially enable one to engage in a conversation without accessing the typical handset associated with the telephone subset. The handset is a conventional device and is coupled to the base of the subset by means of a suitable cable. The handset contains a receiving portion and a transmitting portion. In any event, in the hands-free telephone the receive line is coupled to a loudspeaker whereby the calling party's voice is amplified by means of the loudspeaker. The called party, engaging in the conversation, hears the calling party via the loudspeaker and can communicate with the calling party via a microphone which is built into the subset. In this manner, one can achieve hands-free operation while engaging in a telephone conversation.

As indicated above, many available hands-free telephone subsets utilize an omnidirectional electret condenser microphone which is mounted directly inside the subset. No special mounting techniques are employed. The microphone usually is installed in a neoprene "rubber boot" which attaches directly to the front face of the subset. Both the frequency response and sensitivity are fairly good and the cost is relatively inexpensive. The electret condenser microphone is a well-known component and available from many sources. The electret microphone utilizes a foil electret and requires no polarizing voltage. The frequency response of such devices is within plus or minus 3 db from 50 to 15,000 Hz or greater. Sensitivities of 50 microvolts have been achieved and greater sensitivities are available.

Essentially, the device has a relatively low impedance and can be connected directly to a conventional transistor amplifier. The device is a capacitive-type microphone where the electret capacitor microphone depends on its operation on minute vibrations of capacitance which are produced as sound vibrations impinge on one flexible plate of the capacitor head. In any event, in the case of the electret microphone, the flexible plate is a foil electret constructed of a thinly metalized sheet of fluorocarbon or polycarbonate. The foil contains a permanent static charge. Since its spacing is varied from the fixed element, the electrostatic field is varied thus producing a varying voltage at the output terminals. In any event, as indicated above, such devices are available from many manufacturers for both omnidirectional and unidirectional operation. See, for example, the devices manufactured by Cord Electronics of Westbury, N.Y. There are many other manufacturers who manufacture such devices as United Chem-Con of Rosemont, Ill. and so on.

As indicated, the microphone is available in a unidirectional or omnidirectional mode. Essentially, one can obtain a unidirectional pattern in such a device whereby the response pattern is sometimes referred to as a cardioid pattern. Such patterns are well-known and there are many different types of microphones which will exhibit such patterns. See, for example, a text entitled "Electronic Engineer's Handbook" second edition, published 1982, Chapter 19, pages 19-39 to 19-50. This text shows many examples of existing microphones and their particular responses. In any event, as indicated above, based on prior art operation, most subsets utilize an omnidirectional electret microphone. Since the microphone has an omnidirectional response pattern, it is equally sensitive to sounds arriving at the front, rear or sides of the microphone and essentially cannot distinguish between wanted and unwanted sounds. As a result, even though the subset's loudspeaker is usually placed behind the microphone, unwanted pickup of the loudspeaker signals can and do occur. The microphone's output consists of a mixture of signals both from the loudspeaker and from the human speaker's voice. This composite signal confuses the voice switching control circuits of the subset and can cause false switching, clicking and lockout to occur. In any event, a unidirectional microphone, as opposed to an omnidirectional microphone, would help overcome these defects and further reduce unwanted noise from indirect sources. Hence, it would be desirable to utilize a unidirectional microphone as a microphone on a hands-free telephone set to avoid the above-noted problems.

It is therefore an object of the present invention to provide a housing to accommodate a unidirectional microphone and to assure that the interference from the loudspeaker associated with a telephone subset and other indirect sources will not interfere with the subset's operation in a hands-free mode.

BRIEF SUMMARY OF THE INVENTION

Apparatus for accommodating a unidirectional microphone for use in isolating unwanted sound waves from said microphone which unwanted sound waves emanate from an additional sound source associated with a communication housing, said communication housing being a box-like configuration having a top and bottom surface oriented in the horizontal plane with sidewalls in the vertical plane, with said additional source positioned on the top surface with said communication housing enabling a user to transmit voice via said microphone and to listen via said additional sound source, comprising a microphone housing having an internal hollow with an extending annular flange directed from said microphone housing and communicating with said hollow and of a smaller diameter than said housing and having an internal annular flange within said annular flange against which the back surface of said microphone abuts to enable said microphone to extend into said hollow of such housing to accurately position the diaphragm of said microphone with respect to said hollow and a series of slots located about a portion of the periphery of said microphone housing and spaced apart one from the other with another portion of the periphery of said housing being solid, and means for mounting said housing on a vertical sidewall of said communications housing such that said solid peripheral portion is positioned to maximumly reject undesired sound waves from said additional source with said slots serving to pass said undesired sound waves to enable cancellation of the same with similar sound waves impinging upon the surface of said diaphragm.

BRIEF DESCRIPTIONS OF FIGURES

FIG. 1 is a perspective plan view of a hands-free telephone subset employing a shroud and microphone according to this invention.

FIG. 2 is a diagrammatic view depicting the sensitivity area of a microphone employed in conjunction with the apparatus of this invention.

FIG. 3 is a top plan view of the telephone subset base according to this invention.

FIG. 4, FIG. 4A, FIG. 4B, and FIG. 4C are respectively rear, top, front and cross-sectional views of a microphone housing according to this invention.

Figure 5:
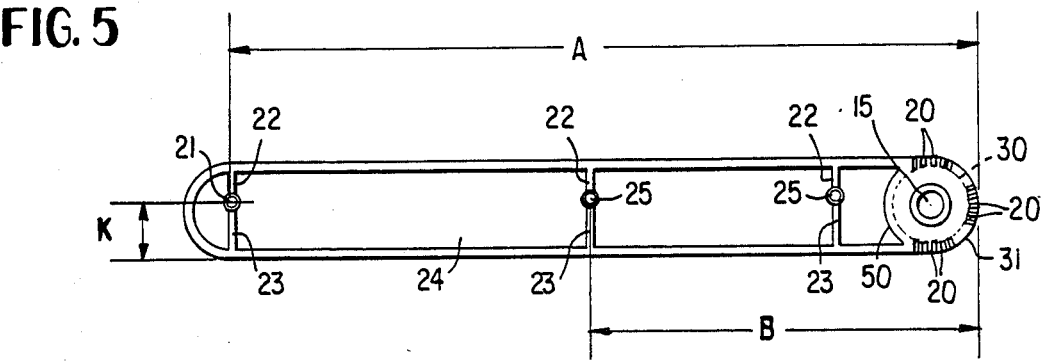

FIG. 5 is a rear plan view of a typical housing and integral shroud employed in this invention and adapted to operate with a sloped sidewall subset.

Figure 6:
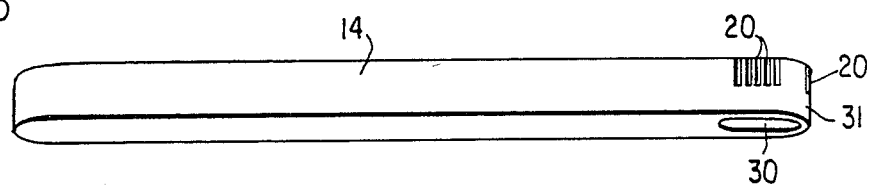

FIG. 6 is a top view of the shroud of FIG. 5.

Figure 7:
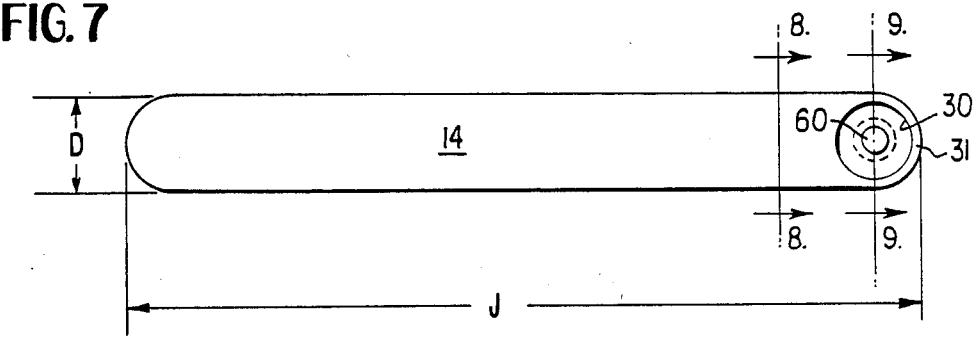

FIG. 7 is a rear view of the shroud of FIG. 5.

Figure 8:
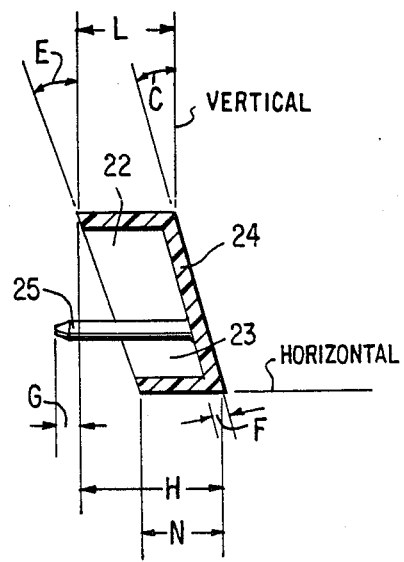

FIG. 8 is a cross-sectional view taken through line 8—8 of FIG. 7.

Figure 9:
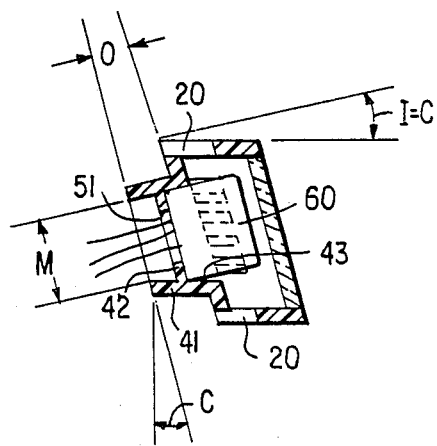

FIG. 9 is a cross-sectional view taken through line 9—9 of FIG. 7.

DETAILED DESCRIPTION OF INVENTION

Referring to FIG. 1 there is shown a typical telephone subset which is capable of hands-free operation. Essentially the telephone subset includes a base 10 and a handset 11 which is attached to the base 10 via a suitable telephone cable as is well known.

As seen in FIG. 1, the base 10 of the subset contains a loudspeaker 12 which is mounted on the top surface to enable a user to communicate or to hear a calling party via the loudspeaker 12. The mounting of the loudspeaker 12 on the top surface of the base 10 is a conventional approach and is employed in a wide plurality of subsets. Shown in FIG. 1 is a shroud 14 which contains an acoustic enclosure or microphone housing for accommodating a unidirectional electret condenser microphone 15. The shroud and associated microphone enclosure is mounted on the front sidewall 19 of the base 10 and the microphone is located on the side so that it is maximumly separated from the loudspeaker 12. The base 10 has a sloped top surface to enable easy consumer interface and normally is a box-like configuration with vertical or sloped sidewalls. The front wall of the base 10 may be sloped for aesthetic purposes and hence the shroud has to be suitably designed to accommodate the slope.

As is shown in FIG. 2, the desirable operation of the microphone and the loudspeaker is depicted. In FIG. 2, the reference numeral 15 again refers to microphone of FIG. 1 which is mounted on the front surface of the subset 10 within the acoustical enclosure or shroud 14. As seen from FIG. 1, the pattern 16 depicts the loudspeaker pattern which essentially should constitute a restrictive area in regard to the pattern 17 which is the sensitivity area of the microphone 15. In order to achieve optimum response, the diaphragm of the microphone should be held or positioned in the vertical plane with the main axis of the microphone housing positioned in the horizontal plane.

As seen from FIG. 2, the unidirectional electret microphone basically exhibits a cardioid pattern and as one can ascertain from FIG. 2, the cardioid pattern 17 takes its name from the fact that the sensitivity area of the microphone 15 is essentially heart shaped.

Shown in FIG. 3 is the positioning of the loudspeaker 12 with respect to the electret microphone 15 as mounted in the shroud or housing 14.

As one will understand more clearly, the apparatus to be described involves the composite construction of a microphone housing an associated shroud, which enables one to therefore mount a unidirectional electret condenser microphone inside the composite assembly. The assembly, as will be ascertained, is attached or formed as an integral part of the front sidewall 19 of the hands-free telephone subset and namely is secured to the base unit as shown in FIG. 1. In either case, the shroud is attached to the subset in such a manner as to provide an acoustic seal between the microphone and the subset proper. The reinforced housing, as will be explained, minimizes the coupling of mechanical borne vibrations between the subset's loudspeaker 12 and the housed microphone 15. In order to preserve the unidirectional properties of the microphone, horizontal slots 20 are placed around the outer edge of the microphone housing. These slots 20 have little or no effect on acoustic signals arriving from the front of the subset but signals arriving from the rear enter both the slots and the front cavity opening.

The microphone construction, which is typical of commercially available devices, is such that these signals appear on both sides of the microphone diaphragm simultaneously and in phase. If the instantaneous sound pressure on both sides of the diaphragm is the same in magnitude and phase, the pressures acting on the diaphragm will cancel and there will be no electrical output signal.

The design, shape and physical nature of the microphone mounting cavity places the resonance point well above the frequency range of interest which ensures a smooth frequency response curve. The response, sensitivity and directional properties of the microphone are preserved while allowing the microphone to be mounted inside a cavity which is physically part of the same housing as the subset circuitry and loudspeaker. This aspect, of course, is shown in FIG. 1, whereby the shroud 14 contains the microphone 15 in a separate integral housing as will be further explained in detail.

Figure 4:
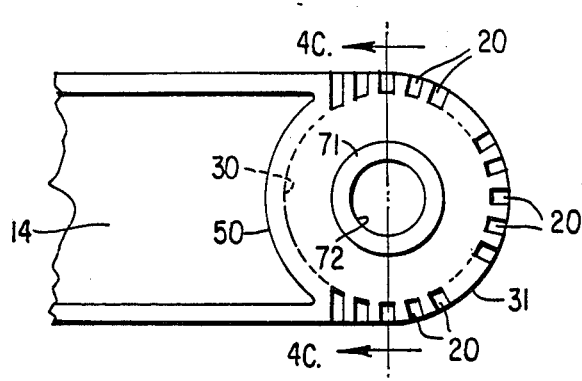

Referring to FIG. 4 there is shown a rear view of a unidirectional microphone housing 31 which is integrally formed with a shroud portion 14. Essentially, as seen from FIG. 4, the housing 31 is circular in shape and has a plurality of slots directed about the periphery. As one can see, the slots 20 are directed about the periphery and essentially each group is symmetrically disposed about a given peripheral section. A first plurality of slots or partial apertures 20 are located at 90° with a second like plurality of slots 20 located at 0° and a third plurality of slots as 20 located at 270°. A substantial portion of the housing peripheral sidewall as 50 does not contain any slots. The reason for this is that when the housing 31 is mounted upon the vertical wall of the telephone subset, the section 50 which does not contain slots acts to attenuate any undesired sound waves which emanate from the loudspeaker and therefore prevents such sound waves from coupling to the microphone which is enclosed within the hollow of housing 31. This housing section 31 is coupled to the elongated shroud member 14 as will be further described and is integrally formed therewith.

Figure 4A:
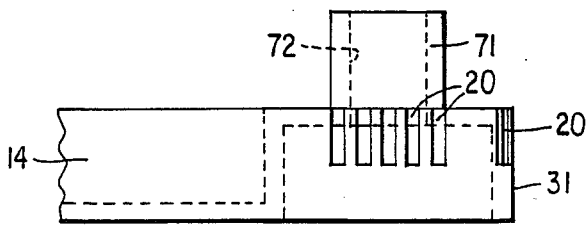
Figure 4B:
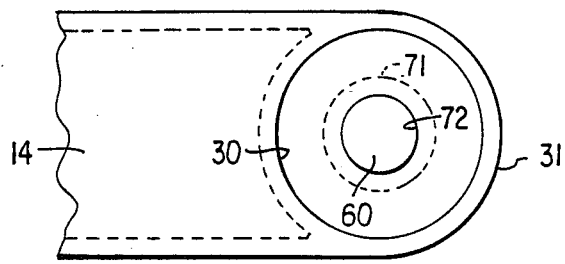
Figure 4C:
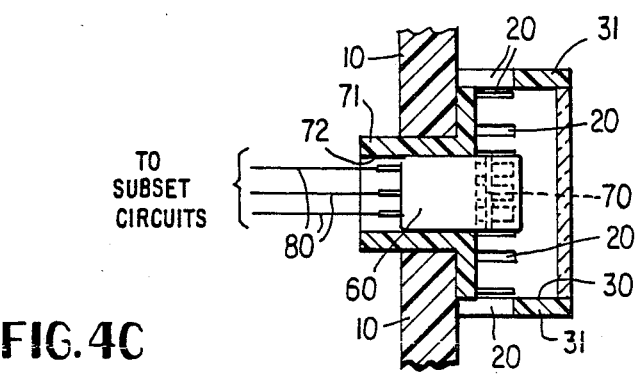

As can be seen from FIG. 4C, the housing 31 contains an extending circular flange 71, which flange 71 is inserted into a suitable aperture of the base housing (as 10 of FIG. 1) containing the telephone circuitry. This is particularly shown in FIG. 4C. FIG. 4A depicts a top view showing the top slots 20 as located about the periphery of the circular housing section 31 and as above described. Essentially, the slots 20 are disposed about the periphery of the housing on the top side and bottom peripheral portions of the housing as seen in FIG. 4. The slots are partial slots to enable selective sound waves to couple to the microphone. The microphone's diaphragm is positioned parallel to the vertical plane whereby the slots take undesired sound waves and couple them to both sides of the diaphragm therefore assuring cancellation of such undesired waves via the diaphragm.

FIG. 4B essentially shows a front view of the housing 31. As seen from FIG. 4B there is a large aperture or microphone port 30 which conventionally is covered by a screen and which aperture is coaxial with the front surface of the diaphragm.

Referring to FIG. 4C there is shown a cross-sectional view taken through line 4C—4C of FIG. 4. Essentially, as can be seen from FIG. 4C, located and surrounded by the annular recess 71 is an electret microphone 60. Such microphones are available from many sources and, for example, a suitable microphone is sold and distributed by a company named United Chem-Con of 9801 West Higgins Road, Rosemont, Ill. and sold under the designation EVN-10. In any event, such microphones are available from many sources. The microphone 60 is a tubular device, as can be seen. Positioned within the microphone is a diaphragm 70. As one can ascertain from FIG. 4C, when the microphone is being accommodated within the hollow of the annular extending flange 71, its back surface abuts against an inner flange 72 which inner flange accurately locates the diaphragm 70 with respect to the slots 20 located about the periphery of the microphone housing 31. In this manner sound waves, which are coupled through the slots, impinge both on the front and back surfaces of the diaphragm to therefore afford cancellation.

In any event, sound waves which impinge on the front of the diaphragm are responded to accurately. This enables the diaphragm microphone to exhibit its unidirectional cardioid characteristics during operation. It has also been noticed that during actual operation the slots 20 serve to allow sound waves to be coupled to the diaphragm which also would be coupled to the front surface of the diaphragm as designated by the arrow shown in FIG. 4C. These sound waves also are cancelled due to operation.

As shown in FIG. 4, the microphone housing 31, which essentially is circular in configuration and which contains the microphone, is also integrally formed with a shroud member 14, as will be further explained. In any event, as one can see from FIG. 4C, the extending annular flange 71 is inserted into a suitable aperture to therefore couple the entire housing to a vertical sidewall as front wall 19 of the hands-free telephone subset base 10, as shown in FIG. 1. As one can also ascertain, the inner flange 72 serves to accurately locate the diaphragm 70 associated with the microphone 60 to assure that the diaphragm is positioned as shown with respect to the slots 20 in the housing section 31. Wires 80, which are connected to the microphone terminals, are directed out of the annular flange or aperture 72 and are connected within the subset to appropriate circuitry.

In any event, the front sidewall 19 of the communication system housing as the base 10, which happens to be a hands-free telephone subset, is normally not vertical. Based on the operation of such subsets and the aesthetic design of the same, the sidewalls associated with the subset housing may be contoured or angled. This is typical and as one will ascertain, by referring to FIGS. 5–9, one can accommodate the dimensions such that the entire housing and the shroud are inclined or fabricated at specific angles to accommodate any slope associated with a sloped vertical sidewall of a communications housing, such as a hands-free telephone set, to enable the microphone diaphragm to be always positioned in the vertical plane, as shown in FIG. 4C. Hence, the following FIGS. 5–9 show a composite shroud and housing which can be utilized in actual production to assume and therefore comply with the exact contours of a sloping vertical wall associated with certain telephone subsets.

It is, of course, understood that a major problem in regard to such subsets is to provide one with an overall aesthetic appearance whereby the entire shroud assembly, including the microphone housing, does not appear to be a separate unit but follows the contours and lines of the existing subset. Hence, the following description relates to a particular design whereby the angles have been selected so that the shroud assumes the exact contours of the subset while further assuring that the microphone is always positioned with its diaphragm in the vertical plane whereby the annular flange 71 is directed with its main axis parallel to the horizontal plane. In this manner, one accurately preserves the unidirectional properties of the accommodated microphone while assuring that the cardioid pattern is maintained and further exhibiting minimum interference from undesired sounds or vibrations that emanate from the loud speaker or other sources.

Referring to FIG. 5, there is shown a rear view of the shroud or housing 14, which accommodates the microphone 15 within a housing 31 on the right-hand side thereof. Similar reference numerals have been retained to denote like functioning parts. As seen from FIG. 5, the shroud section 14 is essentially an elongated housing having rounded left and right sides and is of a U-shaped channel cross section. Located on the right side of the shroud is the microphone enclosure 31. Essentially the enclosure 31, as can be seen in greater detail in the cross-sectional view of FIG. 9, consists of a outer projecting circular member 41, which has an internal hollow and an annular inner flange 42 for abutting up against the back of the microphone 60. The microphone 60 is contained within the cavity 43 of the housing section 31. As seen from FIG. 5, the housing section 31 is associated with the peripheral slots 20, which are located on the top, side and bottom of the housing. These slots 20 are shown as five slots which are located on the top of the housing, five slots on the side of the housing and five slots on the bottom of the housing. These slots, as seen in FIG. 6 are partial slots and are directed towards the center of the shroud 14. Essentially, the shroud 14, as seen in FIG. 5, is a trough-like member having a top planar wall 24, which is completely surrounded by a flange 45. The shroud housing section 14 is supported and is made rigid by means of upstanding posts, as post 21 and 25 for example, which essentially are supported by extending webs 22 and 23, which webs are directed along the surface 24 of the housing and extend to the flange 45. This is best seen in FIG. 8, which is a cross-sectional view taken through line 8—8 of FIG. 7. The posts as 21 and 25 are inserted into the front wall of the telephone subset and act to mechanically couple the shroud assembly to the subset.

The posts further serve as rigid supports for the housing and further serve with the shroud section to enable vibrations due to the loudspeaker and other sources to be dissipated.

The slots 20 operate to preserve the directional properties of the microphone 60, which is located in the recess 43 of the housing section 31. These horizontal slots are placed around the outer edge of the housing section 31, namely at 0°, 90° and 270°. The inner wall of the housing 50 has no slots positioned thereon. This is to eliminate undesired sound waves from propagating to the microphone.

FIG. 6 shows a top view of the shroud and assembly 14 and to more clearly depict the nature of the top slots 20. Also shown in FIG. 6 is a large aperture 30 which is shown in dashed lines as well in FIG. 5. The aperture 30, operates as a front port for the microphone and is covered by a screen or mesh.

FIG. 7 shows a front plan view of the shroud of FIG. 5 whereby the port 30 is more clearly shown and FIG. 7 also indicating the cross-sectional views associated with the assembly as depicted in FIG. 8 and FIG. 9. Essentially, as indicated, the purpose of the microphone housing 31 is to place the resonance curve of the microphone well above the frequency range of interest which assures a smooth frequency response. The reinforced shroud minimizes the coupling of mechanical borne vibrations between the subset's loudspeaker and the microphone. In essence, the shroud 14 as well as the housing section 31 preserves the directional properties of the microphone 60 with the horizontal slots 20 allowing coupling to the diaphragm from both the rear and the front. In this manner, as indicated, certain unwanted signals appear on both sides of the diaphragm simultaneously and in phase. This is due to the nature of the microphone housing 31 and the slots 20.

As seen from FIGS. 8 and 9, the shroud 14 has a sloping back wall 24, which enables it, when placed upon the front surface of a sloped wall telephone subset set, to position the main axis of the microphone in a direction which is parallel to the horizontal plane. This enables the microphone diaphragm, based on the angle associated with the shroud 14, to be positioned relatively parallel to the vertical plane and to allow acoustic signals to be dissipated. Typical dimensions of the unit will be given so as to allow the housing section 31 to be oriented in regard to a sloped front sidewall as 19 of FIG. 1 and to always place the microphone diaphragm parallel to the vertical plane.

In FIG. 5, the dimension designated by "A" is 7.1 inches. The dimension designated by "B" is 3.755 inches. The dimension "K" of FIG. 4 is 0.535 inches. The diameter of the upstanding posts 21 and 25 is 0.063 inches. In FIG. 7, the dimension "D" is 0.848 inches, while the dimension "J" is 7.51 inches. The thickness of the flange 45 is 0.08 inches.

Referring to FIG. 8, the angle "E" is 19.5° while the angle designated as "C" is 12.5°. As one can ascertain, the rod or upstanding post 25, has a tapered front end wherein the angle of taper is approximately 15°, while the dimension "H" is 0.68 inches with the dimension "G" being 0.12 inches. As indicated, the dimension "F", which is the thickness of the bottom wall 24 is also 0.08 inches, which is the same dimension as the upstanding flange. The dimension "L" shown in FIG. 7 is 0.50 inches. The dimension "N" is 0.388 inches.

Referring to FIG. 9, there is shown an aperture 51 which is adjacent the back of the microphone placed in cavity 43. The aperture 51 is 0.250 inches in diameter. Each of the slots, as, for example, shown in FIG. 6, is approximately 0.05 inches wide and separated from an adjacent slot by 0.05 inches. As indicated, there are five slots on the top, on the side and on the bottom, as more clearly shown in FIG. 5. The dimension "M" of FIG. 9 is 0.415 inches. The dimension "O" is 0.190 inches with angle "I" and "C" equal to 12.5°.

These dimensions are typical utilizing a conventional electret microphone described above, which microphone produces an effective frequency range up to about 15 khz. Such microphones are available in diameters of about 10 mm and greater enabling them to be easily accommodated within the cavity.

The slots 20 are 0.275 inches long and, as shown in FIG. 6, extend about the enclosure 31 to enable sound to be directed as described above. The size of the shroud is typical and will operate with most conventional subsets. With the above dimensions being typical of the necessary size to produce such a housing which will enable operation with a plurality of conventional type of subsets now available for hands-free operation. It is immediately ascertained from the above and in regard to the above-noted dimensions, that the shroud, as shown in FIGS. 5-9, can be physically secured to the front surface of a hands-free telephone or can be integrally formed therein. The trough portion of the shroud as portion 24 of FIG. 1, has the upstanding posts as 21, 25, which are secured to the connecting webs as 22 and 23 and act as vibration dampers and to allow coupling of the unit to the base of the subset. In any event, based on the above-described procedure, the apertures serve to direct many interfering sound waves on both the back and top surfaces of the diaphragm to therefore provide cancellation as described above. The shroud and housing as described provides the same output signal level for a unidirectional microphone as that obtained by a typical omnidirectional microphone and this is to ON axis sounds. In regard to OFF axis sounds, the shroud enables 20 db or more of rejection to signals originating OFF axis. As a result the switching action, which is employed in a subset, can be made much more stable and can provide higher transmission levels than would ordinarily be possible.

As one can understand, although the application is primarily intended to be used with a hands-free telephone subset, the application of the technique can encompass other areas, such as portable recording or dictating machines, that provide monitoring facilities while recording. Another application includes a portable public address system where the microphone is permanently installed in a lectern. The total coverage of possible applications basically includes any electroacoustic device designed to intercept and respond to acoustic energy while simultaneously providing an amplified acoustic output of that signal or another unrelated signal. It is therefore a desire to maintain the integrity of a unidirectional microphone by housing the microphone in the shroud and housing assembly according to this invention to enable one to preserve the unidirectional capabilities of the microphone without interference from another source of amplified signals, such as that available from a loud speaker associated with the subset.

It is understood that the shroud and housing can be accommodated to fit or be integrated into any communication housing having any sloped sidewall angle as shown.

In view of the above, there are many alternatives that one skilled in the art would become aware of when reading the above-noted specification and all such alternatives are deemed to be encompassed within the spirit and scope of the claims as appended hereto.

What is claimed is:

1. Apparatus for accommodating a unidirectional microphone for use in isolating unwanted sound waves from said microphone which unwanted sound waves emanate from an additional sound source associated with a communication housing, said communication housing being a box-like configuration having a top and bottom surface oriented in the horizontal plane with sidewalls in the vertical plane, with said additional sound source positioned on the top surface with said communication housing enabling a user to transmit voice via said microphone and to listen via said additional sound source, comprising:

a microphone housing having an internal hollow with an extending annular flange directed from said microphone housing and communicating with said hollow and of a smaller diameter than said microphone housing and having an internal annular flange within said extending annular flange against which the back surface of said microphone abuts to enable said microphone to extend into said hollow of said microphone housing to accurately position the diaphragm of said microphone parallel to the vertical plane with respect to said hollow and a series of slots located about a portion of the periphery of said microphone housing and spaced apart one from the other with another portion of the periphery of said housing being solid, means for mounting said microphone housing on a first vertical sidewall of said communication housing such that said solid peripheral portion is positioned to maximumly reject undesired sound waves from said additional source with said slots serving to pass said undesired sound waves to enable cancellation of the same with similar sound waves impinging upon a responsive surface of said diaphragm, and an elongated shroud member coupled to said microphone housing and extending from the solid peripheral portion thereof and positioned along said first vertical sidewall parallel to the horizontal plane to add mass for reducing mechanical vibrations which would otherwise adversely affect microphone operation.

2. The apparatus according to claim 1 wherein said shroud member has an upstanding peripheral flange extending from the surface thereof and contiguous with the surface of said microphone housing.

3. Apparatus for accommodating a unidirectional microphone for use in isolating sound waves from said microphone which sound waves emanate from an additional sound source remote from said microphone and associated with a communication system housing in which a user communicates via said microphone and listens via said additional sound source, comprising:

an elongated shroud member having a U-shaped channel cross-section with a bottom planar member having an extending flange about the outer peripheral edge completely surrounding said bottom planar member;

a microphone housing integrally formed with said shroud member and having an internal hollow for accommodating said microphone and having an extending annular section which extends above said flange and directed at an angle so that when said shroud is positioned with said planar member oriented with respect to the vertical plane said annular section has a main axis parallel to the horizontal plane, with said shroud and housing acting to selectively dissipate said waves from said additional source, and to enable an accommodated microphone to have its diaphragm parallel to the vertical plane.

4. Apparatus for accommodating a unidirectional microphone for use in isolating sound waves from said microphone which sound waves emanate from an additional sound source remote from said microphone and associated with a communication system housing in which a user communicates via said microphone and listens via said additional sound source, comprising:

an elongated shroud member having a U-shaped channel cross-section with a bottom planar member having an extending flange about the outer peripheral edge completely surrounding said bottom planar member; and a microphone housing integrally formed with said shroud member and having an internal hollow for accommodating said microphone and having an extending annular section which extends above said flange and directed at an angle so that when said shroud is positioned with said planar member oriented with respect to the vertical plane said annular section has a main axis parallel to the horizontal plane, with said shroud and housing acting to selectively dissipate said waves from said additional source, and to enable an accommodated microphone to have its diaphragm parallel to the vertical plane, wherein said communications system is a hands-free telephone subset with said additional source being a loudspeaker mounted on said hands-free telephone subset with the central axis of the loudspeaker cone oriented essentially vertical.

5. The apparatus according to claim 3 wherein said microphone housing includes a plurality of slots about the periphery thereof to selectively couple said waves to the accommodated microphone.

6. The apparatus according to claim 5 wherein said microphone housing is circular and said slots are positioned at ninety degree spaced intervals about the periphery of said circular microphone housing.

7. The apparatus according to claim 3 wherein said extending flange is at a given angle with respect to said bottom planar member with a first section of said flange extending a greater distance from said bottom member than a second section of said flange.

8. The apparatus according to claim 3 further including:

at least one extending post positioned on said planar member and extending beyond said flange and operative to provide mechanical support to said shroud while serving to attenuate sound waves.

9. The apparatus according to claim 3 wherein said unidirectional microphone is an electret microphone having a cardioid pattern.

10. Apparatus for accommodating a unidirectional microphone for use in isolating interfering sound waves from said microphone which sound waves emanate from an additional sound source positioned in a horizontal plane associated with a combustion system housing of the type enabling a user to speak via said microphone and to listen via said additional source, comprising:

an elongated shroud member having a planar bottom surface generally of a rectangular configuration and having along a first long side an extending flange of a given height, with a second long side opposite said first long side having an extending flange of a lesser height with a first short side at one end having a tapered flange wherein said bottom surface is oriented at a given angle when said elongated member is placed on a horizontal surface supporting said second long side;

a hollow microphone housing section located proximate a second short side opposite from said first short side, said hollow microphone housing having a surrounding wall bridging between said extending flanges and co-extensive in height with each of said extending flanges where adjacent, and a central projecting circular flange extending from said wall and oriented at said given angle for accommodating a unidirectional microphone, with said hollow microphone housing section having parallel apertures on the top, bottom and side surfaces which apertures operate in conjunction with said shroud to attenuate sound waves emanating from said additional sound source.

11. The apparatus according to claim 10 wherein said unidirectional microphone is an electret condenser microphone.

12. The apparatus according to claim 10 wherein said communication system housing is a hands-free telephone subset, having said shroud positioned on a front side surface, with said additional sound source being a loudspeaker positioned on a top surface at about said given angle with respect to the horizontal plane.

13. The apparatus according to claim 10 wherein said elongated shroud member is of a length at least five times greater than its width.

* * * * *